United States Patent
Xie

(10) Patent No.: US 9,784,981 B2
(45) Date of Patent: Oct. 10, 2017

(54) LIQUID CRYSTAL DISPLAY DEVICE AND LIQUID CRYSTAL DISPLAY MODULE THEREOF

(71) Applicant: WUHAN CHINA STAR OPTOELECTRONICE TECHNOLOGY CO., LTD, Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 306 days.

(21) Appl. No.: 14/653,999

(22) PCT Filed: May 22, 2015

(86) PCT No.: PCT/CN2015/079565
§ 371 (c)(1),
(2) Date: Jun. 19, 2015

(87) PCT Pub. No.: WO2016/183853
PCT Pub. Date: Nov. 24, 2016

(65) Prior Publication Data
US 2017/0146805 A1    May 25, 2017

(30) Foreign Application Priority Data
May 18, 2015    (CN) .......................... 2015 1 0256765

(51) Int. Cl.
*G02B 27/22* (2006.01)
*G02F 1/29* (2006.01)

(52) U.S. Cl.
CPC ........... *G02B 27/2214* (2013.01); *G02F 1/29* (2013.01)

(58) Field of Classification Search
CPC .................................................. G02B 27/2214
See application file for complete search history.

(56) References Cited

U.S. PATENT DOCUMENTS

2008/0266387 A1*  10/2008  Krijn .................. H04N 13/0404
                                                                    348/51

* cited by examiner

*Primary Examiner* — Phu Vu
(74) *Attorney, Agent, or Firm* — Andrew C. Cheng

(57) ABSTRACT

The invention provides a liquid crystal display module for realizing a switching between 2D and 3D switching and a liquid crystal display device thereof. The liquid crystal display module includes a backlight unit, a liquid crystal display unit and a 2D/3D conversion adjustment unit successively stacked and parallel with one another. The liquid crystal display device and the liquid crystal display module provided by the invention use the arched electrode structural design to make different positions of the liquid crystal layer have different thicknesses. By applying voltages on the electrodes or not to realize the switching between 2D and 3D images, so that the liquid crystal display device is endowed with both functions of playing 2D and 3D images.

20 Claims, 2 Drawing Sheets

LIQUID CRYSTAL DISPLAY DEVICE AND LIQUID CRYSTAL DISPLAY MODULE THEREOF

TECHNICAL FIELD

The invention relates to the field of liquid crystal display technology, and particularly to a liquid crystal display module for realizing a switching between two-dimensional (2D) and three-dimensional (3D) images and a liquid crystal display device thereof.

DESCRIPTION OF RELATED ART

Nowadays, due to the popularity and widespread application of mobile products using liquid crystal display devices, people put forward higher requirements on the quality and user-friendly designs of product. The 3D technology can make the visual experience of viewing screen for human eyes reach a new level, which restores a real visual experience and opens a new chapter in the development of the film and television industry.

However, with the rapid development of electronic information industry, people have more and more functional requirements for electronic products. Such as 3D playback devices, 3D videos played by them require users to wear 3D glasses for watching. 3D display technologies need the users to wear glasses are divided/classified into two kinds of active and passive. The so-called active-type 3D display technology is that the glasses themselves are active, and a 3D effect is established by switching left and right eye images in shutter mode; the so-called passive-type 3D display technology is that the glasses themselves are passive, the separation of left and right eye images is achieved by using an optical filtering technique, the passive glasses are such as polarized stereoscopic glasses, and red and blue stereoscopic glasses. In this way, when the users use the 3D playback devices (for example playing DVD in 3D mode) to watch 3D videos, the users need to buy matched 3D glasses, which would undoubtedly increase the purchase cost, and moreover, when watching the 3D videos, the users need to wear glasses so as to enjoy the 3D effects, but the wearing of 3D glasses in a long time would cause eyes being discomfort; in addition, the existing 3D playback devices can not automatically switch to play normal/general 2D format videos, which brings inconvenience to the users.

Accordingly, it is needed to provide a new play technology for watching 3D videos without wearing 3D glasses and can automatically realize the switching between 2D and 3D video formats. Sometimes, users need immersive visual effects brought by the 3D display, but sometimes the users want to watch the 2D displayed images according to their individual preferences, and therefore there is a need of a display device which can achieve the switching between 2D and 3D, so as to meet the two kinds of requirements.

SUMMARY

Embodiments of the invention provide a liquid crystal display module for realizing a switching between 2D and 3D images and a liquid crystal display device thereof, so as to solve the technical problem that the liquid crystal display devices of the prior art can not realize the switching between 2D and 3D images.

In order to solve the above problem, an embodiment of the invention provides a liquid crystal display module for realizing a switching between 2D and 3D images. The liquid crystal display module includes a backlight unit, a liquid crystal display unit and a 2D/3D conversion adjustment unit successively stacked and parallel with one another.

According to a preferred embodiment of the invention, the 2D/3D conversion adjustment unit includes a upper glass substrate, a lower glass substrate, and electrodes and a liquid crystal which are disposed between the upper substrate and the lower glass substrate.

According to a preferred embodiment of the invention, the electrodes include a planar electrode and a non-planar electrode, the planar electrode is attached to the lower glass substrate, the non-planar electrode is attached to the upper glass substrate, and the liquid crystal is disposed between the planar electrode and the non-planar electrode.

According to a preferred embodiment of the invention, the planar electrode and the non-planar electrode respectively are adapted for receiving voltage signals with reverse polarities so as to form a vertical electric field between the planar electrode and the non-planar electrode, and thereby a switching between 2D and 3D images is realized by selectively applying the voltage signals on the planar electrode and the non-planar electrode or not.

According to a preferred embodiment of the invention, a shape of an end surface of the non-planar electrode includes continuous arches.

According to a preferred embodiment of the invention, the liquid crystal is a positive liquid crystal material, an initial state of the liquid crystal is unoriented and thus the liquid crystal in its initial state is isotropic.

According to a preferred embodiment of the invention, the non-planar electrode includes a base and a conductive layer disposed on the base.

According to a preferred embodiment of the invention, a material of the base is a resin, and the conductive layer is disposed on the base by sputtering.

According to a preferred embodiment of the invention, the continuous arches of the non-planar electrode have a same radius of curvature.

In order to solve the above problem, the invention also provides a liquid crystal display device. The liquid crystal display device includes the liquid crystal display module as described in any one of the above embodiments.

Compared with the prior art, the liquid crystal display device and the liquid crystal display module provided by the invention adopt the arched electrode structural design to make different positions of the liquid crystal layer have different thicknesses. When no voltage is applied between the electrodes, incident light rays from the backlight unit can pass through the 2D/3D conversion adjustment unit without being affected (i.e., parallel pass through), and thereby displaying a normal/general 2D image; whereas, when a voltage is applied between the electrodes, the liquid crystal located therebetween would be deflected/orientated toward a vertical direction, the vertically orientated liquid crystal would produce a phase delay for the incident light rays, and owing to the different thicknesses of the liquid crystal layer at different positions, the parallel incident light rays would change their propagation directions and converge onto a focal point, a 3D light rays focusing effect is achieved, and thereby displaying a 3D image; as a result, the switching between 2D and 3D images is realized, and therefore the liquid crystal display device is provided with both functions of playing 2D and 3D images. In addition, the solution of the invention, compared with the prior art, has some advantages such as simple production process, low cost, good 2D/3D switching effects and easy to operate.

BRIEF DESCRIPTION OF THE DRAWINGS

In order to more clearly illustrate technical solutions of embodiments of the invention, the accompanying drawings used in the embodiments will be made a brief introduction in the following, apparently, drawings described below are a part of embodiments of the invention, for ordinary skill in the art, it is to be understood that under the premise of no creative effort, other drawings can be obtained based on these illustrated drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the protection scope of the invention.

Figure 1:
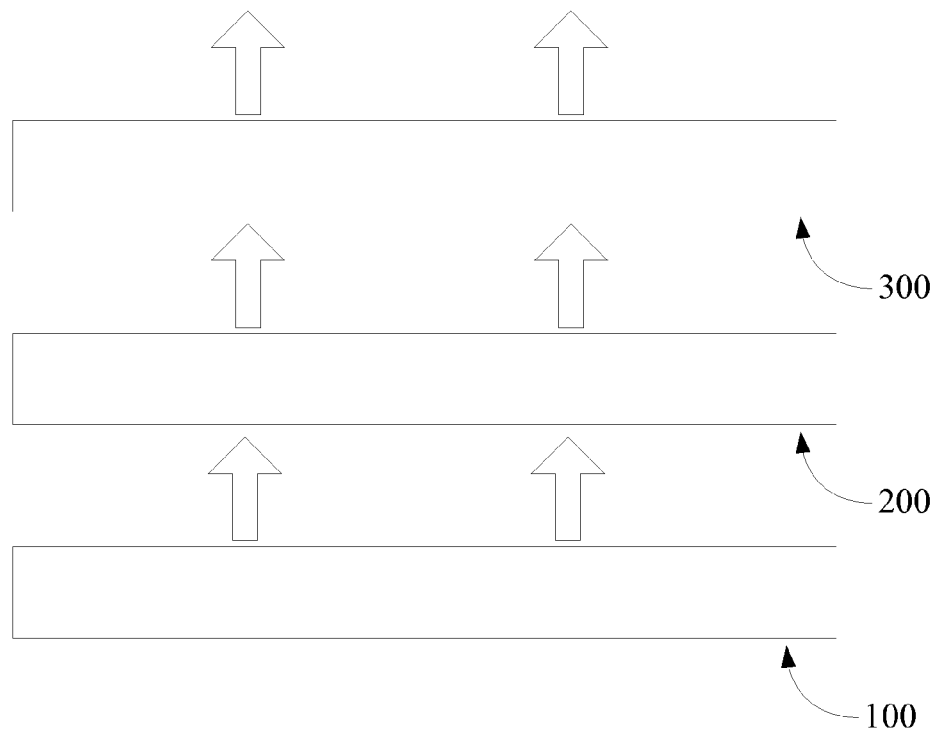
FIG. 1 is a structural schematic view of a preferred embodiment of a liquid crystal display module of the invention.

Referring to FIG. 1, FIG. 1 is a structural schematic view of a preferred embodiment of a liquid crystal display module of the invention. The liquid crystal display module includes a backlight unit 100, a liquid crystal display unit 200 and a 2D/3D conversion adjustment unit 300 successively stacked in that order and being parallel with one another. Arrows in the drawing indicate propagation paths of light rays. The light rays are emitted from the backlight unit 100, and then sequentially passes through the liquid crystal display unit 200 and the 2D/3D conversion adjustment unit 300. The structures and operation principles of the backlight unit 100 and the liquid crystal display unit 200 are in the understanding scope of the skill in the art, and thus will not be described herein.

Figure 2:
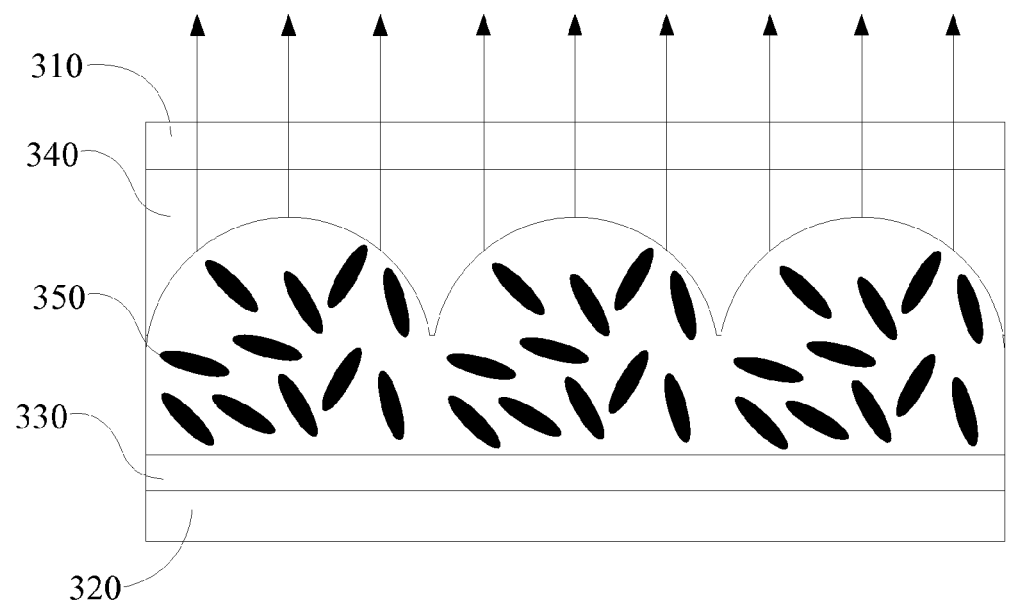
FIG. 2 is a structural principle view of a 2D/3D conversion adjustment unit, in the embodiment associated with FIG. 1, working in a 2D mode.
Figure 3:
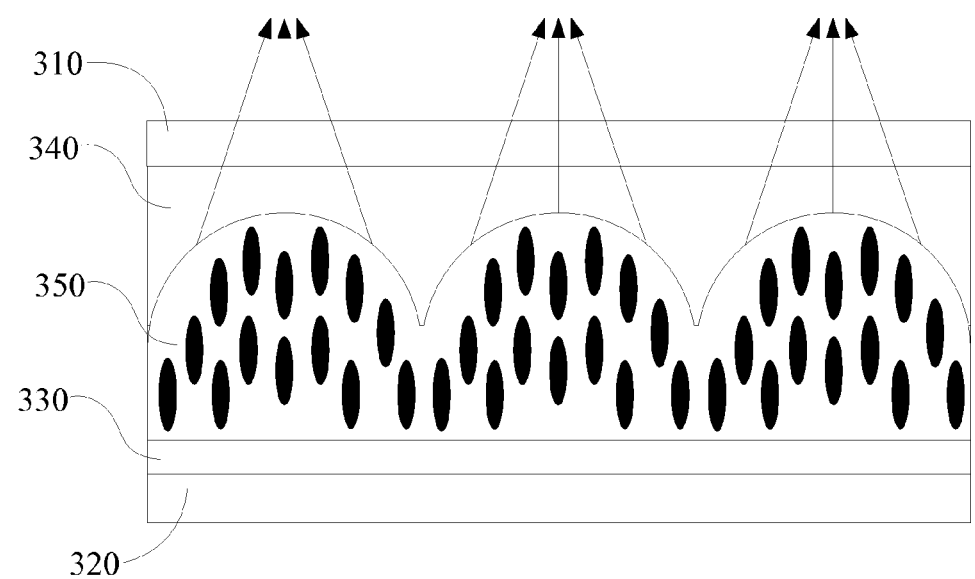
FIG. 3 is a structural principle view of a 2D/3D conversion adjustment unit in the embodiment associated with FIG. 1, working in a 3D mode.

Referring to FIG. 2 and FIG. 3 together, FIG. 2 is a structural principle view of the 2D/3D conversion adjustment unit working in 2D mode according to the embodiment associated with FIG. 1; and FIG. 3 is a structural principle view of the 2D/3D conversion adjustment unit working in 3D mode according to the embodiment associated with FIG. 1. The 2D/3D conversion adjustment unit 300 includes an upper glass substrate 310, a lower glass substrate 320, and electrodes and a liquid crystal 350 which are disposed between the upper glass substrate 310 and the lower glass substrate 320.

Specifically, the electrodes include a planar electrode 330 and a non-planar electrode 340, the planar electrode 330 is attached to the lower glass substrate 320, the non-planar electrode 340 is attached to the upper glass substrate 310, the liquid crystal 350 is disposed between the planar electrode 330 and the non-planar electrode 340. The planar electrode 330 and the non-planar electrode 340 respectively are adapted for receiving voltage signals with reverse polarities so as to form a vertical electric field between the planar electrode 330 and the non-planar electrode 340, and thereby a switching between 2D and 3D images of the liquid crystal display module can be realized/achieved by selectively applying the voltage signals onto the planar electrode 330 and the non-planar electrode 340 or not.

A shape of an end surface of the non-planar electrode 340 preferably includes continuous arches, and the continuous arches of the non-planar electrode 340 have a same radius of curvature, so as to make a display device to focus on a same plane. The liquid crystal 350 is a positive liquid crystal material, an initial state of the liquid crystal is unoriented and thus the liquid crystal in its initial state is isotropic.

The non-planar electrode 340 includes a base and a conductive layer (not shown in the drawing) disposed on the base. Specifically, a material of the base is a resin, and the conductive layer is disposed on the base by sputtering.

In the following, operation/working principles of the liquid crystal display module in 2D and 3D display modes will be briefly introduced/described.

In particular, the planar electrode 330 and the non-planar electrode 340 respectively are adapted for receiving voltage signals with reverse polarities so as to form a vertical electric field. A positive liquid crystal material is injected between the planar electrode 330 and the non-planar electrode 340, the positive liquid crystal 350 is not orientated and thus the liquid crystal 350 is initially in a state of disorder and chaos, that is, the initial state of positive liquid crystal 350 is isotropic. In the 2D mode, no voltage is applied onto the electrodes. Therefore, the positive liquid crystal 350 will maintain the initial isotropic state, as shown in FIG. 2. At this time, incident light rays emitted from the below (backlight unit 100) would pass through the 2D/3D conversion adjustment unit 300, since the liquid crystal 350 in the isotropic state does not produce a phase delay on the light rays, the parallel incident light rays still keeps their original propagation directions. Therefore, a 3D light rays focusing effect will not be generated/produced in this situation, a 2D images is displayed as a result.

In a 3D mode, the planar electrode 330 and the non-planar electrode 340 located between the two layers of glass substrates are applied with voltage signals with reverse polarities respectively, and thereby a vertical electric field is generated. Owing to the effect of the vertical electric field, the positive liquid crystal 350 will be orientated along the vertical direction, as shown in FIG. 3. Owing to the structural design of the arched electrode, thicknesses of the liquid crystal layer are different in different positions. At this time, incident light rays emitted from the below (backlight unit 100) would pass through the 2D/3D conversion adjustment unit 300, the liquid crystal 350 orientated along the vertical direction will make the light rays generate a phase delay, and owing to the different thicknesses of the liquid crystal layer in different positions, the parallel incident light rays would change their propagation directions and converge onto a focal point. Therefore, a 3D light focusing effect is generated/produced, a 3D image correspondingly is displayed. Arrows shown in FIG. 2 and FIG. 3 indicate the propagation directions of light rays.

Compared with the prior art, the liquid crystal display device and the liquid crystal module thereof provided by the invention adopt the arched electrode structural design, so that different positions of the liquid crystal layer have different thicknesses. When no voltage is applied between the electrodes, incident light rays emitted from the backlight unit would pass through a 2D/3D conversion adjustment unit without being affected (i.e., parallel pass through), and thereby displaying a normal/general 2D image; when a voltage is applied between the electrodes, the liquid crystal located therebetween would generate a deflection toward the vertical direction, the vertically orientated liquid crystal will produce a phase delay onto the light rays, and owing to different positions of the liquid crystal layer having different thicknesses, the parallel incident light rays would change their propagation directions and converge onto a focal point, so that a 3D light rays focusing effect is generated, and thereby displaying a 3D image. As a result, the switching between 2D and 3D images is achieved, so that the liquid crystal display device can be provided with both functions of displaying 2D and 3D images. In addition, the method adopted by the invention, compared with the prior art, has some advantages such as simple production process, low cost, good 2D/3D switching effects, and easy to operate.

In addition, another embodiment of the invention provides a liquid crystal display device, and the liquid crystal display device includes the liquid crystal display module as described in the above embodiment. In addition, structural characteristics of other parts of the liquid crystal display device are within the understand scope of the skill in the art, and thus will not be described herein.

The foregoing discussion only is some embodiments of the invention and thus is not to limit the scope of the invention, any equivalent means or equivalent process modification made based on the content of the specification and accompanying drawings of the invention, or being directly or indirectly used in other relevant technical fields, all should be within the protection scope of the invention.

What is claimed is:

1. A liquid crystal display module for realizing a switching between 2D and 3D images, comprising: a backlight unit, a liquid crystal display unit and a 2D/3D conversion adjustment unit successively stacked and parallel with one another; wherein the 2D/3D conversion adjustment unit comprises a upper glass substrate, a lower glass substrate, and electrodes and a liquid crystal disposed between the upper substrate and the lower glass substrate; the electrodes comprise a planar electrode and a non-planar electrode, the planar electrode is attached to the lower glass substrate, the non-planar electrode is attached to the upper glass substrate, the liquid crystal is disposed between the planar electrode and the non-planar electrode, the liquid crystal is a positive liquid crystal material, an initial state of the liquid crystal is unoriented and thus is isotropic, a shape of an end surface of the non-planar electrode comprises continuous arches.

2. A liquid crystal display module for realizing a switching between 2D and 3D images, comprising: a backlight unit, a liquid crystal display unit and a 2D/3D conversion adjustment unit successively stacked and parallel with one another.

3. The liquid crystal display module as claimed in claim 2, wherein the 2D/3D conversion adjustment unit comprises an upper glass substrate, a lower glass substrate, and electrodes and a liquid crystal which are disposed between the upper substrate and the lower glass substrate.

4. The liquid crystal display module as claimed in claim 3, wherein the electrodes comprises a planar electrode and a non-planar electrode, the planar electrode is attached to the lower glass substrate, the non-planar electrode is attached to the upper glass substrate, the liquid crystal is disposed between the planar electrode and the non-planar electrode.

5. The liquid crystal display module as claimed in claim 4, wherein the planar electrode and the non-planar electrode respectively are adapted for receiving voltage signals with reverse polarities to form a vertical electric field between the planar electrode and the non-planar electrode, and thereby a switching between 2D and 3D images of the liquid crystal display module is realized by selectively applying the voltage signals on the planar electrode and the non-planar electrode or not.

6. The liquid crystal display module as claimed in claim 4, wherein a shape of an end surface of the non-planar electrode comprises continuous arches.

7. The liquid crystal display module as claimed in claim 3, wherein the liquid crystal is a positive liquid crystal material, an initial state of the liquid crystal is unoriented and thus is isotropic.

8. The liquid crystal display module as claimed in claim 4, wherein the non-planar electrode comprises a base and a conductive layer disposed on the base.

9. The liquid crystal display module as claimed in claim 8, wherein a material of the base is a resin.

10. The liquid crystal display module as claimed in claim 9, wherein the conductive layer is disposed on the base by sputtering.

11. The liquid crystal display module as claimed in claim 6, wherein the continuous arches of the non-planar electrode have a same radius of curvature.

12. A liquid crystal display device comprising a liquid crystal display module, wherein the liquid crystal display module comprises a backlight unit, a liquid crystal display unit and a 2D/3D conversion adjustment unit successively stacked and parallel with one another.

13. The liquid crystal display device as claimed in claim 12, wherein the 2D/3D conversion adjustment unit comprises an upper glass substrate, a lower glass substrate, and electrodes and a liquid crystal bodies which are disposed between the upper substrate and the lower glass substrate.

14. The liquid crystal display device as claimed in claim 13, wherein the electrodes comprises a planar electrode and a non-planar electrode, the planar electrode is attached to the lower glass substrate, the non-planar electrode is attached to the upper glass substrate, the liquid crystal is disposed between the planar electrode and the non-planar electrode.

15. The liquid crystal display device as claimed in claim 14, wherein the planar electrode and the non-planar electrode respectively are adapted for receiving voltage signals with reverse polarities to form a vertical electric field between the planar electrode and the non-planar electrode, and thereby a switching between 2D and 3D images of the liquid crystal display device is realized by selectively applying the voltage signals on the planar electrode and the non-planar electrode or not.

16. The liquid crystal display device as claimed in claim 14, wherein a shape of an end surface of the non-planar electrode comprises continuous arches.

17. The liquid crystal display device as claimed in claim 13, wherein the liquid crystal is a positive liquid crystal material, an initial state of the liquid crystal is unoriented and thus is isotropic.

18. The liquid crystal display device as claimed in claim 14, wherein the non-planar electrode comprises a base and a conductive layer disposed on the base.

19. The liquid crystal display device as claimed in claim 18, wherein a material of the substrate is a resin, the conductive layer is disposed on the base by sputtering.

20. The liquid crystal display device as claimed in claim 16, wherein the continuous arches of the non-planar electrode have a same radius of curvature.

* * * * *